United States Patent [19]

Robinson et al.

[11] Patent Number: 5,315,161
[45] Date of Patent: May 24, 1994

[54] POWER FAILURE DETECTION AND SHUT DOWN TIMER

[75] Inventors: Thomas S. Robinson, Longwood; David E. Dieska, Lake Mary; Carol A. Hebert-Robinson, Longwood, all of Fla.

[73] Assignee: NCR Corporation, Dayton, Ohio

[21] Appl. No.: 5,854

[22] Filed: Jan. 5, 1993

Related U.S. Application Data

[63] Continuation of Ser. No. 589,300, Sep. 27, 1990, abandoned.

[51] Int. Cl.⁵ .................. G06F 1/30; H02H 3/24; H02J 9/06
[52] U.S. Cl. .................................. 307/66; 371/66; 364/273.4
[58] Field of Search .................. 307/64–66, 307/87; 364/187, 273.4; 371/66

[56] References Cited

U.S. PATENT DOCUMENTS

| | | | |
|---|---|---|---|
| 4,234,920 | 11/1980 | Van Ness et al. | 395/575 |
| 4,458,307 | 7/1984 | McAnus et al. | 395/575 |
| 4,611,289 | 9/1986 | Coppola | 364/492 |
| 4,742,424 | 5/1988 | Kautzer et al. | 361/78 |
| 4,757,505 | 7/1988 | Marrington et al. | 371/66 |
| 4,818,891 | 4/1989 | Drinkwater | 307/64 |
| 4,908,523 | 3/1990 | Snowden et al. | 307/43 |
| 5,012,406 | 4/1991 | Martin | 371/66 X |
| 5,117,324 | 5/1992 | Johnson, Jr. | 307/66 |
| 5,151,855 | 9/1992 | Gray et al. | 364/273.4 |

Primary Examiner—A. D. Pellinen
Assistant Examiner—F. M. Fleming
Attorney, Agent, or Firm—James M. Stover

[57] ABSTRACT

A system and method for providing power from a source of stored electrical energy to a microcomputer for a user established "ride-through" period of time after a disruption in the primary power supply for the microcomputer. If the primary power supply is not restored within the ride-through time period the system performs an orderly shut down of computer applications. Should stored energy reserves run low during the primary power disruption, the system instead performs an abbreviated, critical application shut down. Following application shut down, or upon the expiration of a user established "shut down" time period, the system performs an orderly shut down of computer system operations and thereafter removes all power from the computer. Shut down and shut off procedures are canceled, if possible, upon restoration of the primary power supply.

5 Claims, 4 Drawing Sheets

POWER FAILURE DETECTION AND SHUT DOWN TIMER

This is a continuation of application Ser. No. 07/589,300, filed on Sep. 27, 1990 now abandoned.

The present invention relates to standby power supplies for personal computers. More particularly, the present invention relates to a method which allows a personal computer system to remain powered through most AC power disruptions, and in the case of an extended AC power disruption, allows the personal computer system to perform an orderly shut down before all power is removed.

BACKGROUND OF THE INVENTION

To ensure uninterrupted operation of a computer system dependent upon the receipt of power from an external AC power source, and thereby prevent the loss of data and equipment damage, uninterruptable power source (UPS) systems have been developed to supply the electrical power needs of computer systems during disruptions in primary AC power sources.

The typical UPS includes an inverter for converting a source of stored energy into alternating current power having the same frequency and voltage as the primary AC power source for the computer. An on-line UPS continuously provides power from the inverter regardless of the state of the primary AC power. On-line UPS systems are normally provided for large scale computers. Smaller, less-expensive off-line, or standby, UPS systems which provide power directly from the primary AC power source until an AC power failure is detected are better suited for small computer system applications. Upon detection of a primary AC power failure, the standby UPS system operates to provide power from the stored energy source through the inverter to the computer system.

One such UPS system for supplying power to a group of small computers is disclosed in U.S. Pat. No. 4,611,289. The system includes a standby UPS and a bank of batteries for supplying backup power to the computers when utility power is interrupted. The system further includes a microprocessor which monitors the utility power state and the remaining energy level stored in the back-up batteries. The microprocessor provides to the computer a first signal indicating the loss of primary utility power and a second signal indicating restoration of primary utility power. The first signal is designed to instruct non-critical task computers to perform an orderly shut down. However, the initiation of shut down of critical task computers is delayed until a low energy condition in the back-up batteries is detected.

The shut down routine may include the steps of halting program execution and storing the contents of volatile memory in non-volatile memory, closing open files, logging users off the system, and removing power from the system. The shut down routine may also include procedures for resetting or restarting the computer system in the event primary AC power is restored to the system prior to the completion of all shut down procedures.

Although shut down routines are well known in the art, improvements in such routines are desirable. Improvements may include reducing interference with normal operations and inconvenience to users, delaying of initiation of critical and non-critical program execution curtailment until essential, increasing opportunity for system and application recovery in the event primary AC power is restored, and allowing the user to define application shut down procedures and select ride-through and shut-down time periods.

OBJECT OF THE INVENTION

It is therefore an object of the present invention to provide a new and improved method for operating a computer system which includes an UPS during a primary power disruption.

It is another object of the present invention to provide such a method in which primary and backup power sources are monitored and shut down procedures optimized in response to the availability of power from the monitored power sources.

It is yet another object of the present invention to provide such a method incorporating user specified application shut down procedures.

It is also an object of the present invention to provide such a method incorporating a ride-through procedure which operates for a user configurable time period.

It is a further object of the present invention to provide an improved power failure detection system which allows a small computer system to remain powered through most primary AC power outages.

It is an additional object of the present invention is to provide such a power failure detection system which, in the case of an extended primary AC power outage, allows the small computer system to perform an orderly shut down before all power is removed.

A still further object of the present invention is to provide a power failure recovery system which is capable of sustaining several primary AC power failures over a short period of time.

SUMMARY OF THE INVENTION

There is provided, in accordance with the present invention, a method for operating a small computer system which includes a standby power supply for providing electrical power from a source of stored electrical energy, such as a bank of batteries, to the computer system during disruptions in the supply of electrical power from the computer system's primary power source.

The method comprises the steps of monitoring the supply of electric power from the primary electrical power source to detect disruptions in the primary supply of electric power and monitoring the supply of reserve energy available from the stored electrical energy source associated with the standby power supply.

Upon the occurrence of a primary power failure, assuming that a sufficient supply of electrical power is available from the stored energy source, an orderly shut down of computer system applications is performed. This orderly shut down may include the steps of saving user files and screens, logging users off, and otherwise putting an orderly end to all application processes.

A critical application shut down of computer applications is performed when the stored energy supply falls below a predetermined level and a primary power supply failure has occurred. Only very basic application cleanup is performed during the critical application shut down procedure.

The described embodiment includes the step of delaying the initiation of the orderly shut down for a user-selected "ride-through" period of time after the detection of failure in the supply of electrical power from the primary electrical power source. A system shut down culminating in the disconnection of the standby power supply from the computer system is performed after the conclusion of the orderly or critical shut down procedures. Should the primary power source be restored during the ride-through period application shut down procedures will not be performed. If primary power is restored during either of the shut down routines, the computer system will be returned to an operational state upon the conclusion of the shut down procedure.

The above and other objects, features, and advantages of the present invention will become apparent from the following description and the attached drawings.

DETAILED DESCRIPTION OF THE PREFERRED EMBODIMENT

Figure 1:
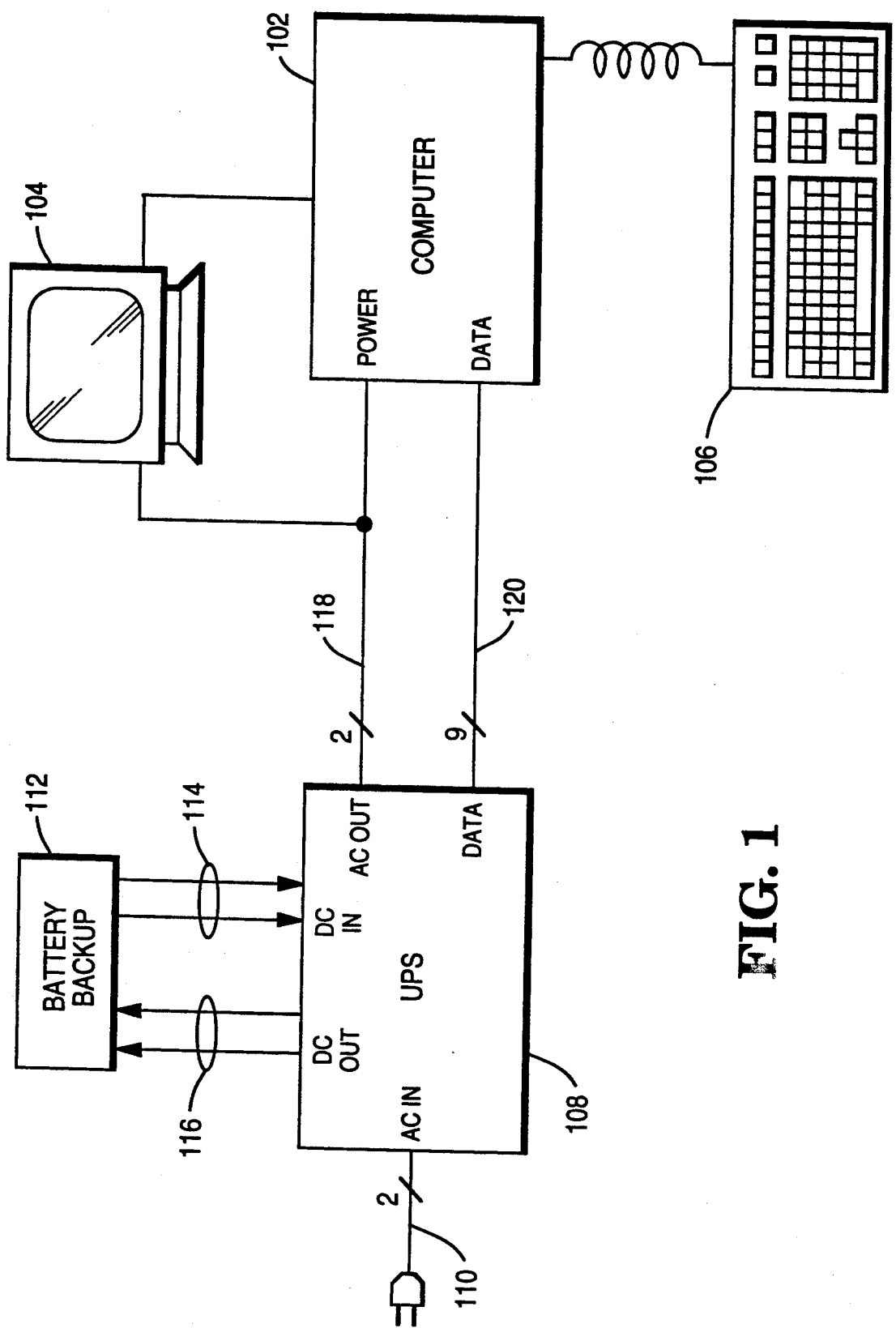
FIG. 1 is a block diagram representation of a personal computer connected to an uninterruptable power supply according to the present invention.

Referring now to FIG. 1, there is seen a personal computer system including a processor or computer 102, monitor 104, keyboard 106 and standard connecting cables. The computer 102 and monitor 104 are supplied with electrical power from a uninterruptable power supply (UPS) 108 through conductors 118. During normal operation, UPS 108 provides power from a primary AC line 110 connected to an external, utility operated 120 VAC, 60 hertz power source, not shown.

Upon detection of a primary AC power failure, the UPS converts energy provided via conductors 114 from a source of stored electrical energy 112, generally a bank of batteries, into alternating current having the same voltage and frequency as the power provided by the primary power source. Electrical energy is provided to stored energy source 112 by charging circuits included in UPS 108 during normal operation of the primary AC power source.

The computer and UPS system as described above are well known in the art. However, in addition to the features structure recited above, a nine conductor cable 120 is connected between UPS 108 and a RS-232 serial port at computer 102 to provide communication between the two devices. The UPS provides the following four output signals to the computer: power failure signal, battery low signal, plug out signal and plug status signal. Provided by the computer to the UPS are a shut down signal and a plug test signal. These signals will be discussed in greater detail below. The UPS inputs and outputs the communication signals at RS-232 levels, a "high" level denoting a voltage level more positive than 3 volts DC but less than 12 volts DC at the receiver and a "low" level denoting a voltage level more negative than −3 volts DC but greater than −12 volts DC at the receiver.

The power failure (PF) signal is normally at a high level, indicating that power is being supplied from the primary AC power source. The signal is set to a low level when a primary AC fault condition is detected. A primary AC fault condition exists whenever the primary AC voltage falls below 85% or rises above 112% of nominal voltage.

The battery low (BL) signal is at a high level when the primary AC power is within the limits set out above and backup battery 112 is fully charged. The battery low signal is set to a low level when the UPS senses that there is only enough energy remaining in reserve to support the full load of the computer system for two to three minutes.

The plug out (PO) signal is a high level signal used to sense that communications cable 120 connecting the UPS and computer system has not been disconnected. The plug out signal does not change state.

The plug status (PS) and plug test (PT) signals are also used to test the communications connection between the UPS and computer system. The plug test signal is a dynamic output of the computer while the plug status signal is nothing more than the plug test signal provided by the UPS back to the computer. The computer toggles the plug test signal between high and low levels at regular intervals and monitors the level of the plug status signal to verify that the plug status signal is at the same level as the plug test signal.

The normally high level shut down (SD) signal is set to a low level by the computer upon completion of an orderly shut down. By setting the shut down signal to a low level, the computer operates a shut off mechanism included within the UPS to disconnect the backup battery from the UPS, thereby conserving remaining battery reserves for future AC power disruptions.

Figure 2:
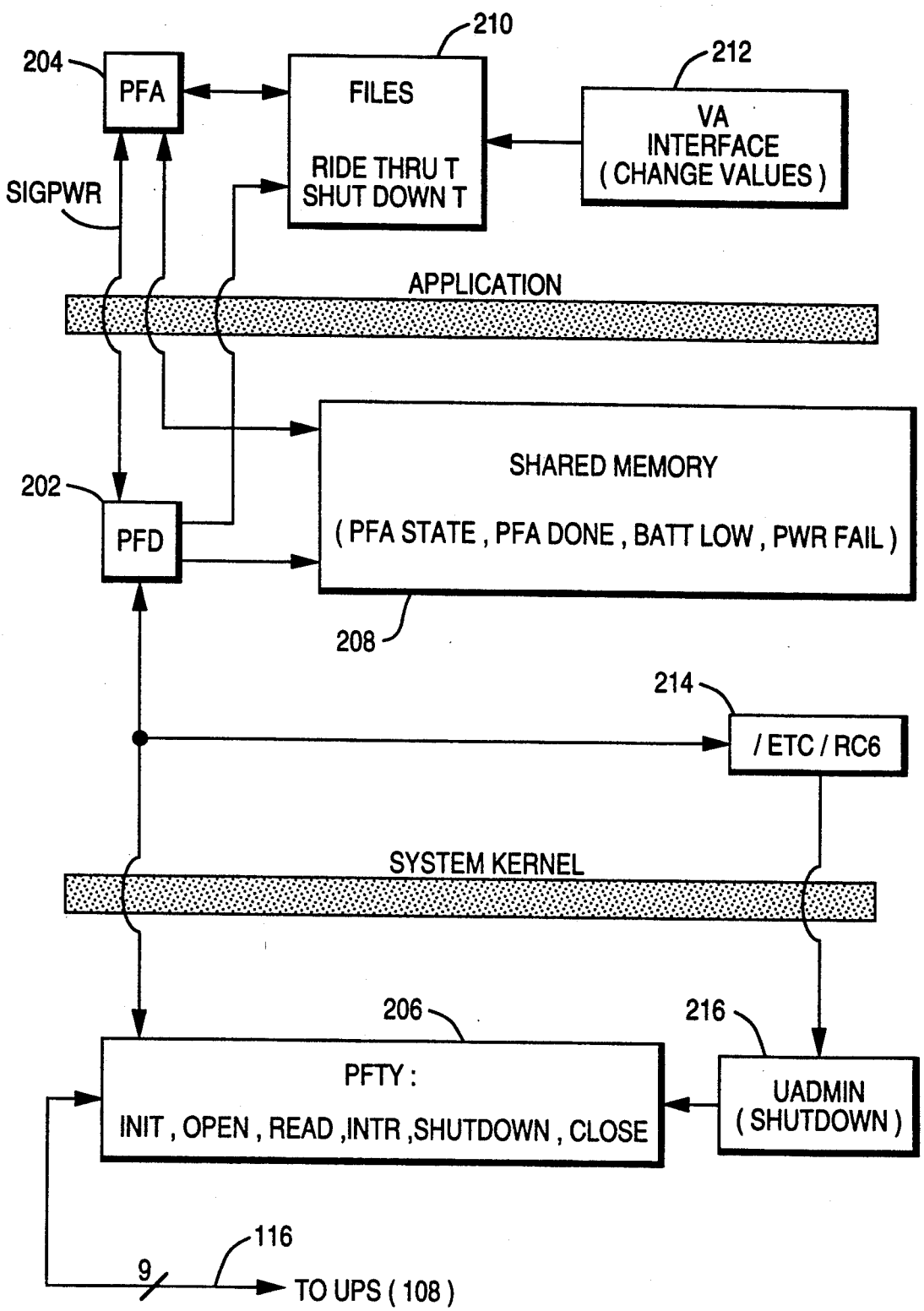
FIG. 2 is a block diagram illustrating the interaction between the power failure detection system program modules and files and other software components residing within the computer shown in FIG. 1.

A block diagram illustrating the software modules and files programmed into computer 102 for monitoring the UPS communication signals and conducting an orderly shut down of computer applications and the computer system in the event of a prolonged power failure is shown in FIG. 2. In the preferred embodiment of the invention the computer operates in a UNIXR base operating environment.

The program includes a Power Failure Detection (PFD) module 202 which operates in the computer's base operating system environment to control system shut down and generation of the UPS shut down signal. The PFD module receives communication signals PF, BL, PS and PO from UPS 108 through a kernal level input/output driver 206, labeled pfty. The shut down signal SD is provided by the PFD module to the UPS through a shut down kernal level interface 214 and 216 and I/O driver 206.

The PFD module operates in conjunction with a user-tailorable Power Failure Application (PFA) module 204. The PFD and PFA modules communicate through the use of a shared memory 208 and a signal SIGPWR. The PFD module uses SIGPWR to signal the PFA module to check the shared memory for AC power failure and DC battery reserve conditions. The PFA module uses SIGPWR to signal the PFD module to check the shared memory for application shut down complete and application shut down committed indications. Shared memory values, described in greater detail below, include signals batt_low, pwr_fail, pfa_state and pfa_done. The PFD module also generates and uses signals plug_out and shut_down, also discussed below.

In its basic form, the PFA module provides ride-through and application shut down countdowns, console logging of power changes and shut down status, and all signal and shared processing necessary for basic PFD-PFA interaction. The PFA module may also be tailored by the user to include any desired additional application shut down procedures.

Application ride-through and application shut down time periods are stored in files ride_thru_t and shut_down_t, respectively, as shown by block 210. A menu provided through an interface 212 to a visual administrator, not shown, allows the user to change the ride-through and shut down time periods to any time from zero to ninety-nine minutes.

The operation of the PFD and PFA modules will now be explained with reference to the state diagrams of FIGS. 3 and 4. A value of "1" for power failure signal pwr_fail in FIGS. 3 or 4 indicates that an AC power failure has been detected. Similarly, a value of "1" for battery low signal bat_low indicates that battery reserves are low, a value of "1" for plug out signal plug_out warns that the UPS to computer connection has been severed, a value of "1" for the signal pfa_state signals that ride-through time has expired, a value of "1" for signal pfa_done indicates that PFA application shut down has been completed and a value of "1" for the signal shut_down represents that an orderly system shut down has been completed. PFD module signals batt_low, pwr_fail and plug_out reflect the state of signals BL, PF and PO, respectively, received from the UPS. Signal SD is set in response to corresponding signal shut_down.

Figure 3:
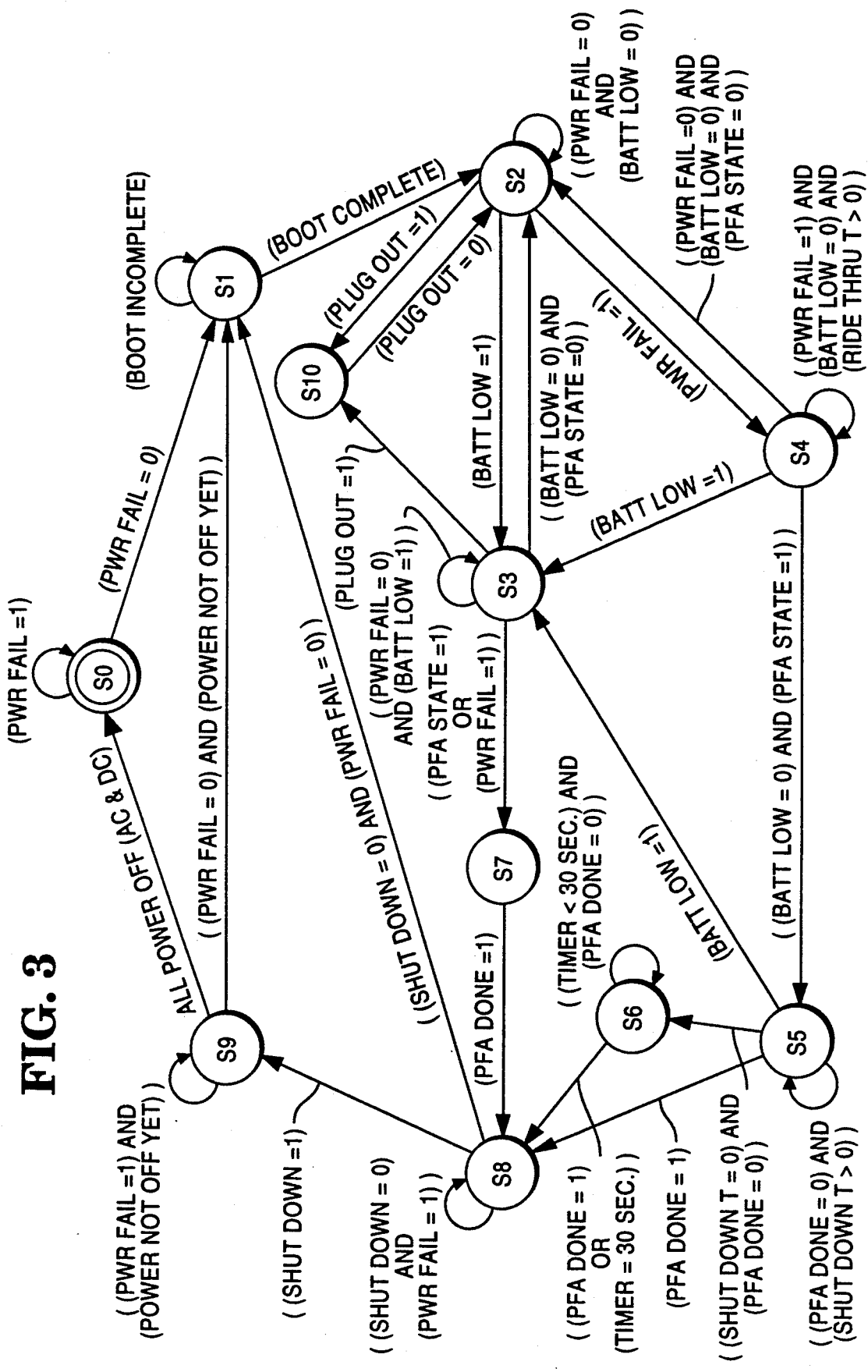
FIG. 3 is a state diagram illustrating the sequential operation of the power failure detection module (PFD) shown in FIG. 2.

FIG. 3 is a state diagram illustrating the sequential operation of PFD 202 shown in FIG. 2. Node S0 represents the system and power off state. This is the state the computer is in before power is turned on. Node S1 represents the boot system state. It is during this state that system start-up, application start-up and PFD initialization occur. The normal running state of the computer is shown by node S2. Pwr_fail, batt_low and plug_out signal all have a value of "0" during normal operation.

Upon the occurrence of a power failure, shared memory signal pwr_fail is set to 1 and system operation advances to the "ride-through" state represented by node S4. The signal SIGPWR is sent to the PFA module which, after examining the shared memory in order to determine the cause of signal SIGPWR, begins the user-configurable application ride-through countdown. Computer applications may continue to run in this state until either the user-configured ride through time period (ride_thru_t) expires, AC power is restored, or a battery failure condition occurs. If AC power is restored prior to ride through time expiration computer operation is returned to the S2 state. If the ride-through time expires, pfa_state is set and system shut down is committed whether AC power is restored or not.

An orderly shut down of applications occurs during state S5. Also during this state, the PFA decrements the shut down timer. After completion of application shut down processing, the PFA sets pfa_done and signals the PFD to begin system shut down (state S8). However, should the shut down time expire before application shut down processing has been completed, the PFD proceeds to state S6. During state S6 the PFA is given another thirty seconds to complete application shut down. If pfa_done is set during this time, the timer is cancelled and the system proceeds with regular system shut down (state S8), otherwise, when the timer expires the user is given a warning and is allowed thirty seconds to log off before system shut down begins.

If a battery low condition is detected at any time during states S2, S4 or S5 the PFD notifies the PFA by setting batt_low to 1 and sending the SIGPWR signal. If low battery reserves are detected during an AC power outage, the PFA cancels the ride-through countdown (state S4) or the current application shut down (state S5) processes and begins a critical application shut down immediately. Should low reserves be detected during the normal running state (state S2) the PFD enters a "battery failure condition" state (state S3). In this state the user is warned of the condition of the battery charge. Critical application shut down begins immediately upon the occurrence of a power outage during state S3.

Critical application shut down (state S7) provides basic application cleanup prior to system shut down (state S8). One minute is allowed for application cleanup during state S7.

An orderly shut down of system functions occurs during state S8. After an orderly system shut down has been completed signal shut_down is set to inform the UPS to disconnect the backup power source thereby shutting of all power to the computer. For a short period of time between when shut_down is set and when the backup power source is actually disconnected, the system operates in state S9. If primary AC power is restored during either of states S8 or S9, the system is automatically rebooted and state S1 entered.

State S10, referred to as the "plug pulled out" state is entered from either of states S2 or S3 in the event the connecting link between the UPS and the computer's RS-232 port is removed. PFA and PFD interaction will continue as it was prior to the disconnection with warnings messages being periodically displayed on the computer monitor. However, the PFD will not be able to detect or process any AC or DC power outages or restorations. Restoration of the connecting link between the UPS and computer will enable normal PFD operation to continue and will allow the PFD module to resume detection and processing of pwr_fail and batt_low signals.

Figure 4:
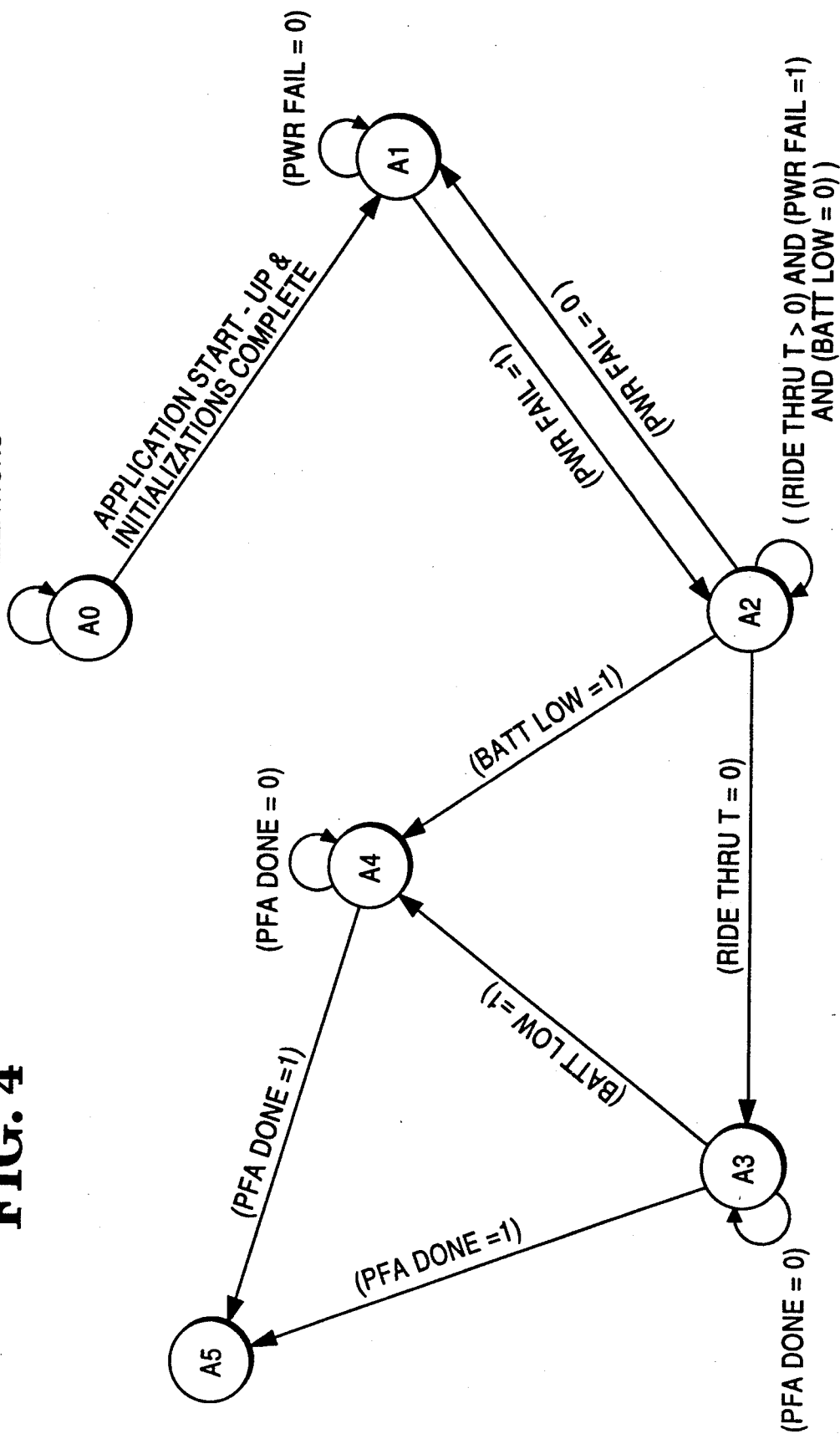
FIG. 4 is a state diagram illustrating the sequential operation of the power failure application module (PFA) shown in FIG. 2.

FIG. 4 is a state diagram illustrating the sequential operation of PFA 204 shown in FIG. 2. PFA state A0 occurs automatically after basic system start-up routines have been performed by the PFD module. During state A0 application start-up and initializations are performed. Upon completion of state A0 operations, the PFA enters state A1. The system remains in this state until the PFA receives notification from the PFD that a power failure has occurred.

Upon notification of the occurrence of a power failure by the PFD, PFA operation advances to the "ride-through" state represented by node A2, beginning the user-configurable application ride-through countdown. Computer applications may continue to run in this state until either the user-configured ride through time period (ride_thru_t) expires, AC power is restored, or a battery failure condition occurs. If AC power is restored prior to ride through time expiration PFA operation is returned to the A1 state.

PFA operations advance to application shut down state A3 upon the expiration of the ride-through period, ride_thru_t. In this state, all currently running applications may be shut down in an orderly fashion, user files may be closed and users may be logged off. Following the completion of all application clean-up and shut-down procedures, or upon the expiration of the user-configured time period for performing application shut down (shut_down_t), the PFA module sets signal pfa_done to 1 and informs the PFD module that application shut down is complete and that system shut down procedures may begin.

Should the PFA module receive a battery low signal from the PFD module while in either state A2 or A3, critical application shut down occurs. In the critical application shut down state (state A4) immediate orderly cleanup of the applications identified by the user as being most critical is performed. One minute is provided for critical shut down. Upon completion of critical shut down procedures, pfa_done is set and the PFD module is signaled to begin system shut down.

The PFA module enters a waiting state (state A5) following the conclusion of normal application shut down procedures (state A3) or critical application shut down procedures (state A4). In state A5, application processing has concluded and the PFA is simply waiting for termination.

It can thus be seen that there has been provided by the present invention an improved method for operating a UPS supported computer system during primary power disruptions. The method monitors primary and backup power sources and optimizes computer application and system shut down procedures in response to the availability of power from the monitored power sources. The method can be used with a personal computer or a file server supporting several personal computers.

The system described allows the computer user to structure application shut down procedures for a normal shut down where primary power has been disrupted but sufficient power is available from the backup power source to continue computer applications, and a critical shut down wherein primary power has been disrupted and backup power reserves are low. In addition the user can set the duration of ride-through and application shut down time periods. However, the ride-through period can be set to extend the ride-through time period to the maximum permitted by the backup power reserves thereby allowing applications to continue as long as possible before the system begins the minimal, critical application shut down and thus increasing chances of a primary power recovery cancelling shut down. Conversely, by minimizing the ride-through time period the duration of the shut down time period may be increased to permit maximum time for application shut down procedures.

The system as described also includes a hardware shut down mechanism within the UPS which is operated by the PFD module through the signal shut_down. The shut down mechanism allows the user to shut down the UPS inverter to conserve battery reserve time. As it can take sixteen to twenty-four hours to fully recharge the backup battery if fully discharged it is recommended that the user select ride through and shut down time periods which avoid excessive depletion of energy from the backup batteries. Otherwise shutdown difficulties or the loss of applications or data may result if successive AC power outages are experienced.

For example, if during a first sustained AC power outage, application shutdown is delayed until the battery low signal is received by the PFD module, battery reserves will be nearly exhausted. Should AC primary power be subsequently restored and then, after a brief period of normal operation, interrupted again the backup battery may not contain sufficient energy reserves to permit a second orderly, or possibly critical, application shutdown to occur. The user customizable shutdown feature of the present invention allows the user to structure the system such that several back-to-back AC power failures may be sustained within a twenty-four hour period without suffering the loss of applications or data.

Although the presently preferred embodiment of the invention has been described, it will be understood that various changes may be made within the scope of the appended claims.

What is claimed is:

1. A method for operating a computer system including a standby power supply, said standby power supply providing electrical power to said computer system from a source of stored electrical energy during disruptions in the supply of electrical power from a primary electrical power source for said computer system, the method steps comprising:

monitoring the supply of electric power from said primary electrical power source to detect disruptions in the supply of electric power from said primary source;

monitoring the supply of energy available from said stored electrical energy source;

providing power from said source of stored electrical energy to said computer to sustain normal operation of said computer after a primary power supply disruption has been detected;

providing power from said primary source to said computer upon the detection of a primary power supply restoration;

performing an orderly shut down of computer applications upon the expiration of a first predetermined period of time measured from the initial detection of said primary power supply disruption without the detection of a primary power supply restoration;

performing a critical application shut down of computer applications upon the combination of said stored energy supply decreasing below a predetermined level and the detection of a primary power supply disruption said orderly shut down of computer applications being terminated upon initiation of said critical application shut down of computer applications; and performing an orderly shut down of computer system operations upon the first to occur of the conclusion of orderly shut down of computer application procedures or the conclusion of critical application shut down procedures.

2. The method according to claim 1, further comprising the step of canceling the initiation of said orderly shut down of computer applications in the event that a restoration of the supply of power from said primary power source is detected prior to the expiration of said first predetermined time period.

3. The method according to claim 1, further comprising the step of canceling said orderly shut down of computer system operations in the event that a restoration of the supply of power from said primary power source is detected prior to completion of computer system operations shut down procedures.

4. The method according to claim 1, further comprising the step of automatically shutting off power to said computer upon the conclusion of computer system operations shut down procedures.

5. The method according to claim 1 wherein the step of shutting off power to said computer includes the step of shutting off the standby power supply to conserve the remaining supply of energy available from said stored electrical energy source.

* * * * *